United States Patent [19]

Knighton et al.

[11] Patent Number: 5,420,733
[45] Date of Patent: May 30, 1995

[54] ELECTRICAL CONNECTOR THAT IS FASTENED TO A HARD DISK DRIVE HOUSING BY PINS THAT EXTEND FROM A HOUSING AND ARE INSERTED INTO CORRESPONDING CONNECTOR APERTURES

[75] Inventors: David B. Knighton, Longmont; Harold Beecroft, Colorado Springs, both of Colo.

[73] Assignee: Maxtor Corporation, San Jose, Calif.

[21] Appl. No.: 140,755

[22] Filed: Oct. 22, 1993

Related U.S. Application Data

[63] Continuation-in-part of Ser. No. 74,291, Jun. 9, 1993, Pat. No. 5,392,175.

[51] Int. Cl.[6] .............................................. G11B 17/00
[52] U.S. Cl. .................................................. 360/97.01
[58] Field of Search ...... 360/97.01, 97.02, 97.06–97.12

[56] References Cited

U.S. PATENT DOCUMENTS

| | | | |
|---|---|---|---|
| 4,965,684 | 10/1990 | Stefansky | 360/97.01 X |
| 5,025,336 | 6/1991 | Morehouse et al. | 360/97.01 X |
| 5,243,495 | 9/1993 | Read et al. | 360/97.01 X |
| 5,264,975 | 11/1993 | Bajorek et al. | 360/97.01 X |
| 5,274,288 | 12/1993 | Stefansky | 360/98.07 X |
| 5,280,403 | 1/1994 | Martin | 360/97.01 X |
| 5,282,100 | 1/1994 | Tacklind et al. | 360/97.02 |

Primary Examiner—John H. Wolff

[57] ABSTRACT

A hard disk drive which contains a connector that is mounted to a printed circuit board and attached to a disk drive housing that complies with the PCMCIA specifications. The base plate and cover of the disk drive each have a pair of pins that are pressed into corresponding apertures in the connector housing to attach the connector to the hard disk drive. The cover and base plate also have studs that are pressed into corresponding slots in the connector housing to further mount the connector to the disk drive. The connector housing further has a pair of recessed surfaces that receive corresponding raised surfaces in the plates to insure that the cover and base plate are flush with the top surface of the connector.

10 Claims, 3 Drawing Sheets

5,420,733

ELECTRICAL CONNECTOR THAT IS FASTENED TO A HARD DISK DRIVE HOUSING BY PINS THAT EXTEND FROM A HOUSING AND ARE INSERTED INTO CORRESPONDING CONNECTOR APERTURES

This application is a CIP of application Ser. No. 08/074,291, filed Jun. 9, 1993, now U.S. Pat. No. 5,392,175.

BACKGROUND OF THE INVENTION

1. Field of the Invention

The present invention relates to an electrical connector for a hard disk drive assembly.

2. Description of Related Art

Most computer systems include a massive memory storage device such as a hard disk drive. Hard disk drive units contain a magnetic disk that is rotated by a spin motor. The drive unit also has a head that magnetizes and senses the magnetic field of the disk. The head is typically located at the end of an actuator arm which can move relative to the magnetic disk. The actuator arm, motor and other components of a typical disk drive unit are relatively small and fragile, and are therefore susceptible to damage when subjected to excessive external loads or vibration. For this reason, hard disk drives are usually rigidly mounted to the housing of the computer system by screws or other fastening means.

Hard disk drives contain programs and other information that are vital to the user. It is sometimes desirable to transfer such information to a different computer system. Transferring programs from a hard disk typically requires loading the information onto a floppy disk, or sending such information over a phone line. Such methods can be time consuming, particularly if the program is long or there is a large amount of data. There have been developed portable hard disk drives which can be plugged into a slot in the computer. To reduce the amount of possible component damage to the drive unit, the housing and assembly are typically constructed to be quite rugged. These rugged assemblies are heavy and bulky, and generally impractical to carry and store.

The Personal Computer Memory Card International Association (PCMCIA) has promulgated specifications for portable memory cards which can be plugged into slots within a computer. The PCMCIA standard includes a type I format, a type II format and a type III format, each format being distinguished by a different card thickness. Memory can be added to a computer by merely plugging in an additional card. Similarly, a modem or facsimile (FAX) card can be added to a system with the push of the hand. The standardized format of the cards allows a user to plug the memory card of one computer into another computer regardless of the type or make of either system.

The standardized cards are approximately the size of a credit card and include a connector which mates with a connector in the computer. The assignee of the present application has developed hard disk drive units which meet the type III format of the PCMCIA standard. The type III disk drives typically mount the connector to a printed circuit board within the housing of the drive unit, by soldering the leads of the connector to surface pads on the circuit board. Any relative movement between the connector and the circuit board will induce stress in the leads. Such movement may occur when the drive unit is inserted and removed from the host computer. Repeated insertions may cause the solder joints and leads to fatigue and break, thereby rendering the disk drive inoperable. The structural integrity of the solder leads can be improved by mounting the connector to the printed circuit board with screws. Requiring screws increases the assembly time and cost of the drive unit, particularly screws small enough to meet the height requirements of the PCMCIA standard. It would be desirable to have a PCMCIA type disk drive which has a connector that is rigidly mounted to the printed circuit board without using any fasteners.

SUMMARY OF THE INVENTION

The present invention is a hard disk drive which contains a connector that is mounted to a printed circuit board and attached to a disk drive housing that complies with the PCMCIA specifications. The base plate and cover of the disk drive each have a pair of pins that are pressed into corresponding apertures in the connector housing to attach the connector to the hard disk drive. The cover and base plate also have studs that are pressed into corresponding slots in the connector housing to further mount the connector to the disk drive. The connector housing further has a pair of recessed surfaces that receive corresponding raised surfaces in the plates to insure that the cover and base plate are flush with the top surface of the connector.

Therefore it is an object of the present invention to provide a hard disk drive assembly which has a connector that is rigidly mounted to a printed circuit board without using threaded fasteners.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
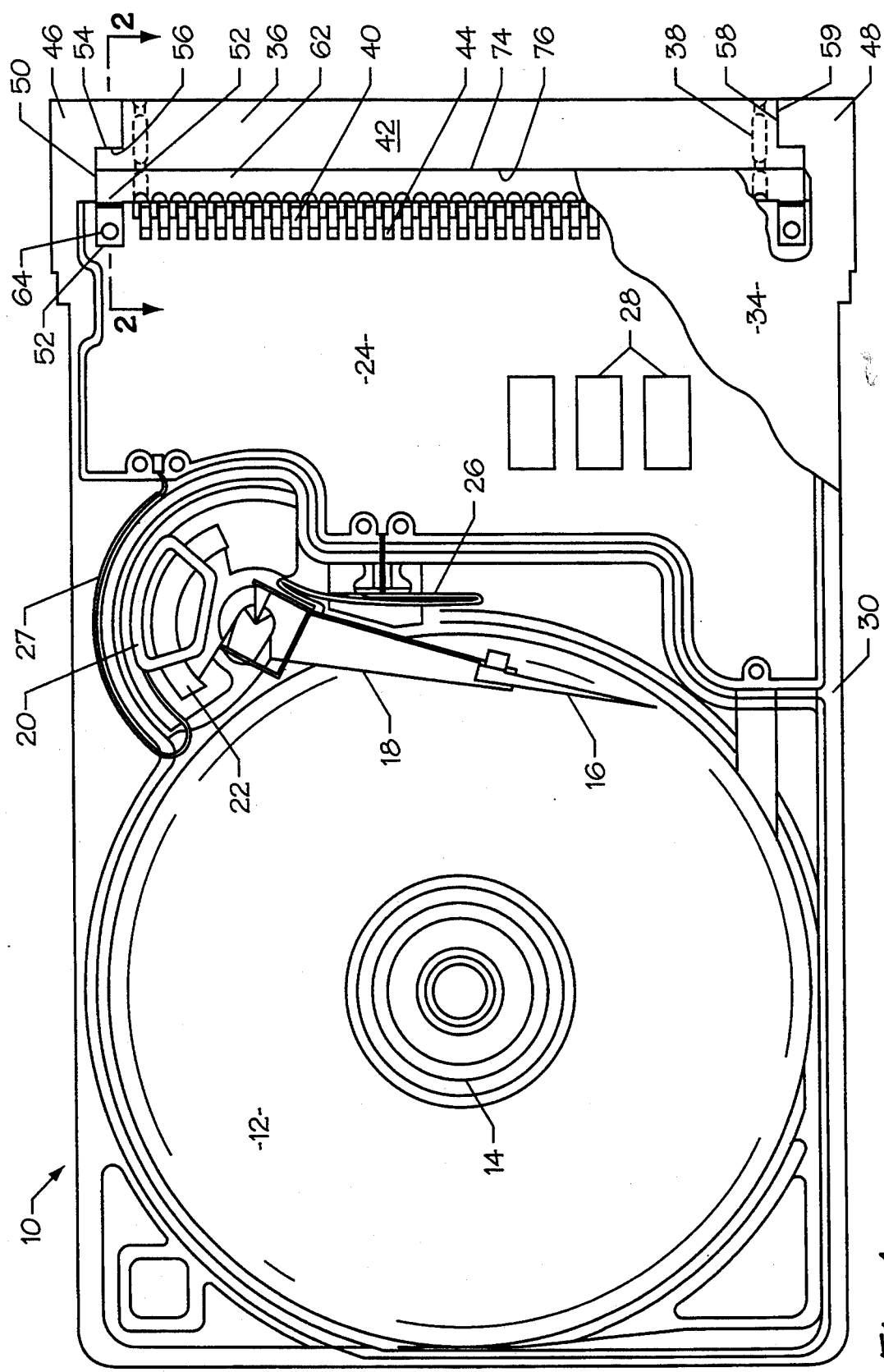
FIG. 1 is a top sectional view of a hard disk drive that has a connector located within a housing and mounted to a printed circuit board of the drive.
Figure 2:
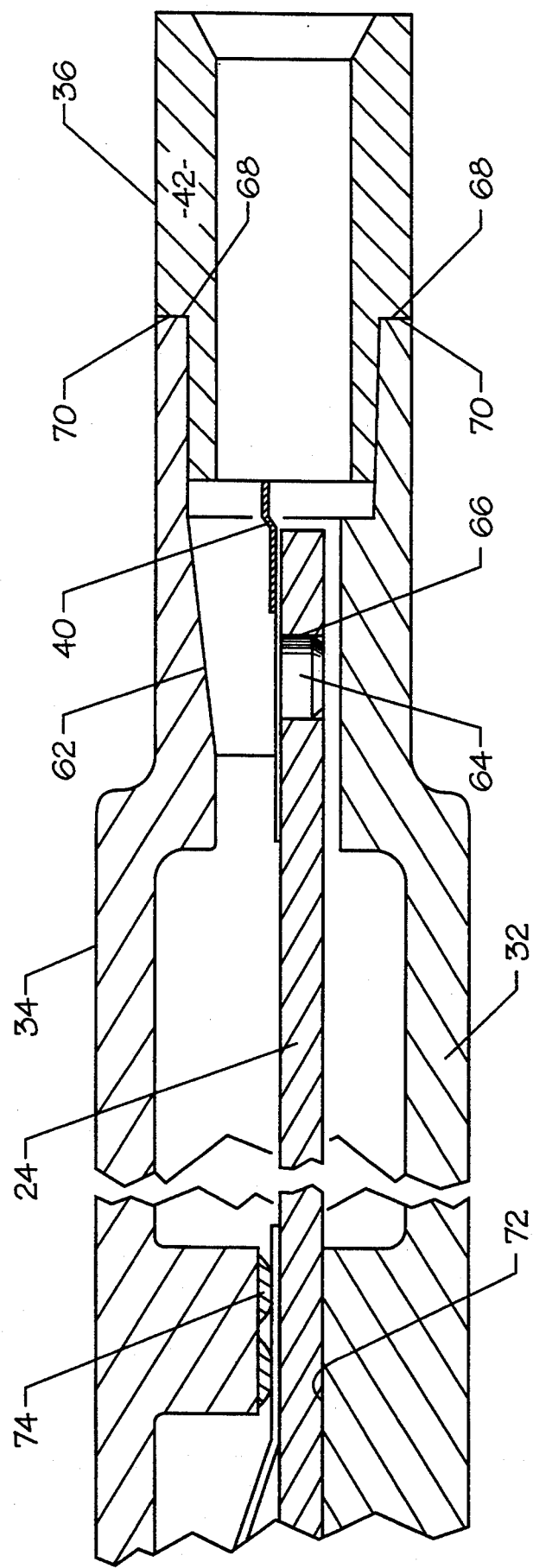
FIG. 2 is a cross-sectional view taken at line 2—2 of FIG. 1.

Referring to the drawings more particularly by reference numbers, FIGS. 1 and 2 show a hard disk drive 10 of the present invention. The disk drive assembly 10 has a magnetic disk 12 that is coupled to a spin motor 14. The spin motor 14 rotates the disk 12 relative to a magnetic head 16 that is mounted on the end of an actuator arm assembly 18. The actuator arm assembly 18 includes a voice coil 20 that is coupled to a magnet 22, which together move the actuator arm relative to the disk 12. The magnetic head 16 and voice coil 20 are coupled to a printed circuit board 24 by a flexible circuit boards 26 and 27, respectively. Mounted to the printed circuit board 24 are a plurality of electronic devices 28 that are used to control the operation of the drive unit.

The disk 12, actuator arm assembly 18 and printed circuit board 24 are all enclosed within a housing 30. As shown in FIG. 2 the housing includes a base plate 32 and a cover plate 34. In the preferred embodiment, the housing has the dimensions of 85.6×54.0×5.0 millimeters. The dimensions conform with the specifications issued by the Personal Computer Memory Card International Association (PCMCIA) for a type II electronic card. The PCMCIA is an association that has promulgated a specification which list dimensions and other requirements for a standard electronic card. Each computer that conforms with the PCMCIA specification will contain slots that can receive a standardized card. With such a standard, electronic cards of one computer can be readily plugged into another computer, regardless of the model or make of the computers.

The PCMCIA standard includes three types of cards which each have varying thicknesses. A type I card is approximately 3.3 millimeters thick, a type II card is approximately 5.0 millimeters thick and a type III card is approximately 10.5 millimeters thick. The computer has a plurality of adjacent slots that are wide enough to receive a type II card. Both the type I and II cards occupy a single slot, while the type III card occupies two slots. Each computer slot contains a 68 pin connector that is typically mounted to a motherboard to provide an interconnect to the computer system.

The disk drive 10 has a connector 36 which can mate with a corresponding connector within the host computer. The connector preferably has 68 pins and is typically of the pin and socket variety, commonly referred to as a pin connector. In the preferred embodiment, the pin connector 36 has a plurality of sockets 38 which each have a tail 40 that extends from the housing 42 of the connector 36. The tails 40 are soldered to surface pads 44 on the printed circuit board 24 to provide an electrical path between the electronic devices 28 and the host computer.

The base plate 32 and cover plate 34 have a pair of first arms 46 and second arms 48, respectively. Each arm has a step 50 located adjacent to the printed circuit board 24. The connector has a pair of ears 52 that conform to the shape of the steps 50 and are adjacent to the arms of the plates 32 and 34. The ears 52 have an outer surface 54 that can engage a corresponding inner surface 56 of the arms to prevent movement of the connector 36 away from the printed circuit board 24. The plates are also constructed so that surfaces 58 of the arms can engage the outer surface 59 of the connector housing 42 to prevent lateral movement of the connector 36 relative to the baseplate 32 and cover 34. The base plate 32 and cover 34 have surfaces 68 that engage surfaces 70 of the connector 36 to prevent the connector 36 from moving relative to the circuit board 24 when the disk drive is inserted into the connector of the host computer.

As shown in FIG. 2, the base 32 and cover 34 plates each have steps 60 that extend across the width of the housing 30 between the arms of the plates. The connector housing 42 has corresponding steps 62 which are captured by the step portions 60 of the plates. The steps 16 and 62 prevent the connector 36 from moving relative to the circuit board in a direction perpendicular to the surface of the disk 12. In the preferred embodiment, the ears 52 of the connector and steps 60 of the plates 32 and 34 have inclined surfaces 64. The ears 52 also have pins 64 that extend into apertures 66 in the printed circuit board 24. The pins 64 align the solder tails 40 to the surface pads 44 of the board 24. One of the pins has two opposite flat surfaces that allows the pin to move within the aperture. The clearance between the pin and aperture compensates for tolerances in the assembly.

The circuit board 24 is clamped to a step 72 of the base plate 32 by an elastomeric member 74 that extends from the cover plate 34. The elastomeric member 74 allows the circuit board 24 to move relative to the plates 32 and 34. Thus when the disk drive is subjected to a thermal load, the circuit board is allowed to shrink or expand independently of the plates so that the solder tails are not strained. The disk drive can accommodate thermal cycles between $-60°$ F. and $300°$ F.

The engaging surfaces of the connector 36 and housing 30 prevent any relative movement between the connector 36 and the printed circuit board 24, thereby minimizing the stress on the solder tails 40 during the insertion and removal of the disk drive into a host PCMCIA socket. This is accomplished by the present invention without the use of screws, pins or any other fastening means. The connector mount of the disk drive 10 is therefore simple to assemble and less costly to produce than drives in the prior art.

Figure 3:
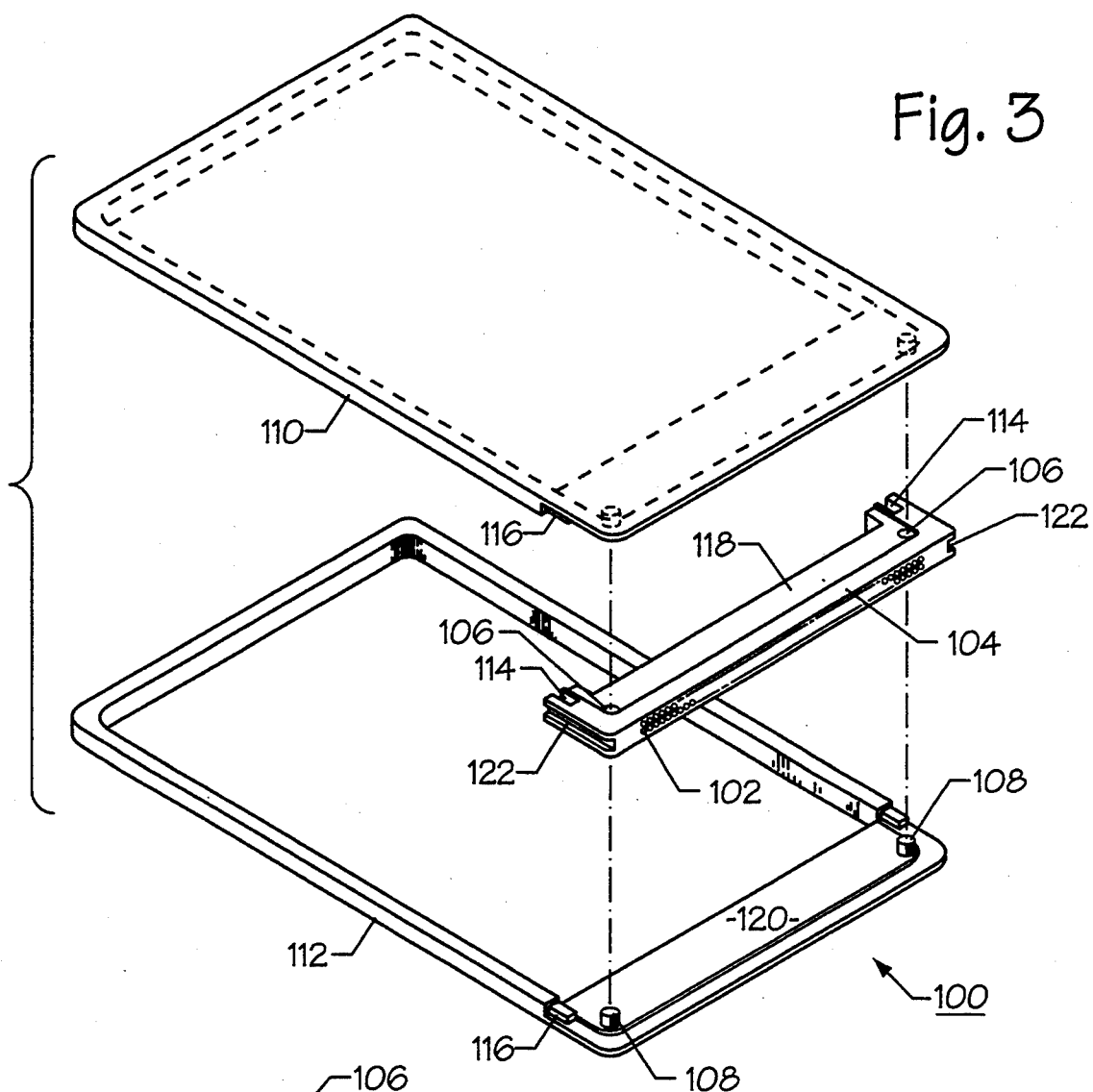
FIG. 3 is an exploded view of an alternate embodiment of a connector and a disk drive housing.
Figure 4:
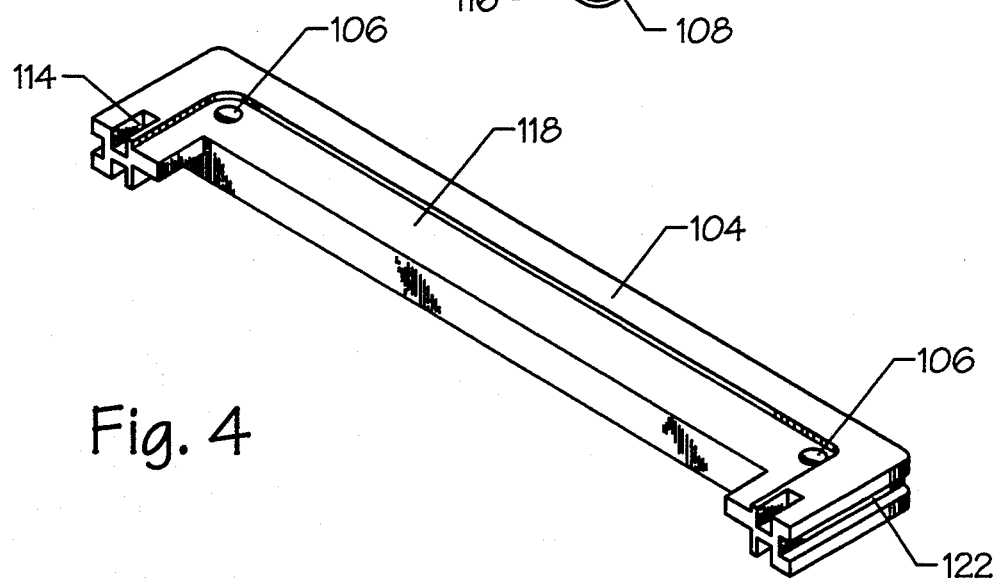
FIG. 4 is a perspective view of the connector of FIG. 3.

FIGS. 3 and 4 discloses an alternate embodiment of a connector 100 which can be mounted to a disk drive card that complies with the PCMCIA specifications. The connector 100 has a plurality of sockets 102 that have tails (not shown) that are soldered to a printed circuit board of the hard disk drive assembly unit. The sockets 102 are located within a housing 104 that is typically constructed from an injection molded dielectric material.

The connector housing 104 has a pair of apertures 106 that receive corresponding pins 108 which extend from the cover plate 110 and base plate 112 of the hard disk drive assembly. The apertures 106 and pins 108 are preferably constructed so that there exist a press fit between the two members. The pins 108 and apertures 106 align the connector 100 with the printed circuit board of the disk drive. The pins 108 also provide structural support for the solder joints of the connector 100 when the disk drive is inserted into and removed from the host system.

Located at each end of the connector 100 are a pair of slots 114 that receive corresponding studs 116 in the plates 110 and 112. The studs 116 and slots 114 further secure the connector 100 to the disk assembly and prevent relative lateral movement between the connector 100 and the printed circuit board.

The connector housing 104 has a pair of recessed surfaces 118 that receive corresponding raised surfaces 120 in the cover and base plates 110 and 112. The recess surfaces allow 118 the plates to lie flush with the top surface of the connector. The recess and raised surfaces also provide further structural support for the connector and prevent relative lateral movement between the connector and the printed circuit board in a direction along the width of the hard disk drive. The connector housing 104 may also have a pair of outer slots 122 that cooperate with corresponding card edge supports in the host system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly that can be coupled to a host system, comprising:

a base plate having a pair of first pins;

a cover plate having a pair of second pins;

a magnetic disk enclosed by said base plate and said cover plate;

an actuator arm assembly enclosed by said base plate and said cover plate;

a printed circuit board enclosed by said base plate and said cover plate; and, a connector that is connected to said printed circuit board and can be plugged into the host system, said connector having a pair of apertures that receive said first and second pins so that said connector is attached to said base plate and said cover plate.

2. The hard disk drive assembly as recited in claim 1, wherein said connector has a plurality of slots that receive corresponding studs in said cover plate and said base plate.

3. The hard disk drive assembly as recited in claim 1, wherein said connector has a pair of recessed surfaces that receive corresponding raised surfaces in said cover plate and said base plate.

4. The hard disk drive assembly as recited in claim 1, wherein said connector has a pair of outer slots.

5. The hard disk drive assembly as recited in claim 1, wherein said connector has a plurality of solder tails that are connected to said printed circuit board.

6. A hard disk drive assembly that can be coupled to a host system, comprising:

a base plate having a pair of first studs;

a cover plate having a pair of second studs;

a magnetic disk enclosed by said base plate and said cover plate;

an actuator arm assembly enclosed by said base plate and said cover plate;

a printed circuit board enclosed by said base plate and said cover plate; and, a connector that is connected to said printed circuit board and can be plugged into the host system, said connector having a plurality of slots that receive said first and second studs so that said connector is attached to said base plate and said cover plate.

7. The hard disk drive assembly as recited in claim 6, wherein said connector has a pair of recessed surfaces that receive corresponding raised surfaces in said cover plate and said base plate.

8. The hard disk drive assembly as recited in claim 7, wherein said connector has a plurality of apertures that receive corresponding pins in said cover plate and said base plate.

9. The hard disk drive assembly as recited in claim 8, wherein said connector has a pair of outer slots.

10. The hard disk drive assembly as recited in claim 9, wherein said connector has a plurality of solder tails that are connected to said printed circuit board.

* * * * *